(12) United States Patent
Wada et al.

(10) Patent No.: US 10,782,478 B2
(45) Date of Patent: Sep. 22, 2020

(54) INTER-MODE LOSS DIFFERENCE COMPENSATOR AND OPTICAL AMPLIFIER

(71) Applicant: NIPPON TELEGRAPH AND TELEPHONE CORPORATION, Tokyo (JP)

(72) Inventors: Masaki Wada, Tsukuba (JP); Taiji Sakamoto, Tsukuba (JP); Takayoshi Mori, Tsukuba (JP); Shinichi Aozasa, Atsugi (JP); Takashi Yamamoto, Tsukuba (JP); Kazuhide Nakajima, Tsukuba (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/322,432

(22) PCT Filed: Aug. 1, 2017

(86) PCT No.: PCT/JP2017/027858
§ 371 (c)(1),
(2) Date: Jan. 31, 2019

(87) PCT Pub. No.: WO2018/025847
PCT Pub. Date: Feb. 8, 2018

(65) Prior Publication Data
US 2019/0196106 A1    Jun. 27, 2019

(30) Foreign Application Priority Data

Aug. 3, 2016  (JP) ................................. 2016-153169
Aug. 4, 2016  (JP) ................................. 2016-153996

(51) Int. Cl.
*G02B 6/26*      (2006.01)
*H01S 3/10*     (2006.01)
(Continued)

(52) U.S. Cl.
CPC ............... *G02B 6/266* (2013.01); *G02B 6/02* (2013.01); *G02B 6/02023* (2013.01);
(Continued)

(58) Field of Classification Search
None
See application file for complete search history.

(56) References Cited

U.S. PATENT DOCUMENTS 5,633,974 A      5/1997  Chia
5,796,891 A *    8/1998  Poustie .............. G02B 6/12007
                                                              372/6
(Continued)

FOREIGN PATENT DOCUMENTS

CN       1459645 A      12/2003
EP       0903598 A1     3/1999
(Continued)

OTHER PUBLICATIONS

N. Hanzawa et al., "Demonstration of mode-division multiplexing transmission over 10 km two-mode fiber with mode coupler". OFC2011, paper OWA4.
(Continued)

*Primary Examiner* — Rhonda S Peace
(74) *Attorney, Agent, or Firm* — Harness, Dickey & Pierce, P.L.C.

(57) ABSTRACT

A differential mode attenuation compensator includes a first multi-mode optical fiber and a third multi-mode optical fiber in which a plurality of propagation modes propagate in a wavelength of a propagating optical signal; and a second multi-mode optical fiber including a core and a clad and arranged with a central axis aligned between the first multi-mode optical fiber and the third multi-mode optical fiber, in
(Continued)

which each loss in the plurality of propagation modes is different in the first multi-mode optical fiber and the third multi-mode optical fiber.

4 Claims, 10 Drawing Sheets

(51) Int. Cl.
  *H01S 3/067* (2006.01)
  *G02B 6/02* (2006.01)
  *G02B 6/036* (2006.01)

(52) U.S. Cl.
  CPC ......... *G02B 6/036* (2013.01); *G02B 6/03688* (2013.01); *G02B 6/03694* (2013.01); *H01S 3/067* (2013.01); *H01S 3/10* (2013.01)

(56) References Cited

U.S. PATENT DOCUMENTS

| | | | | |
|---|---|---|---|---|
| 6,327,403 | B1* | 12/2001 | Danziger | G02B 6/03644 |
| | | | | 385/126 |
| 6,434,311 | B1 | 8/2002 | Danziger et al. | |
| 8,089,689 | B1* | 1/2012 | Savage-Leuchs | B29C 48/255 |
| | | | | 359/341.1 |
| 10,050,404 | B2* | 8/2018 | Farrow | H01S 3/0675 |
| 2016/0142142 | A1 | 5/2016 | Ryf et al. | |
| 2018/0224599 | A1* | 8/2018 | Bennett | G02B 6/0281 |
| 2019/0196106 | A1* | 6/2019 | Wada | G02B 6/02 |

FOREIGN PATENT DOCUMENTS

| | | |
|---|---|---|
| EP | 1184693 A3 | 8/2003 |
| EP | 2533435 A1 | 12/2012 |
| JP | 51-151557 A | 12/1976 |
| JP | 2013-004590 A | 1/2013 |
| JP | 2013004590 A * | 1/2013 |

OTHER PUBLICATIONS

T. Sakamoto et al., "Modal Dispersion Compensation Technique for Long-haul Transmission over Few-mode Fibre with SIMO Configuration" ECOC2011, We. 10. P1 .82.
K. Shibahara et al. "Dense SDM (12-Core × 3-Mode) Transmission Over 527 km With 33. 2-ns Mode-Dispersion Employing Low-Complexity Parallel MIMO Frequency-Domain Equalization", J. Lightw. Technol., vol. 34, No. 1 (2016).
Nagase, et al., "SC-type fixed optical attenuator using metal doped fiber", Technical Report of IEICE, EMD95-4, 1995 (with partial translation).
Mori,T. et al., Experimental Verification of Signal Quality Difference Induced by Differential Modal Loss and Modal Crosstalk on Optical MIMO Transmission and its Compensation by Equipartition Multiplexing, Journal of Lightwave Technology, Feb. 1, 2016, vol. 34, No. 3, 918-927.
International Search Report issued in PCT/JP2017/027858 (in English and Japanese), dated Oct. 31, 2017; ISA/JP.
Extended European Search Report from counterpart EP178369518, dated Feb. 24, 2020.
China Office Action Re: Application No. 201780047802.X. dated Dec. 25, 2019.

* cited by examiner (a7-a6)/a5=0.5/9.0

(a7-a6)/a5=1.0/9.0

(a7-a6)/a5=2.0/9.0

(a7-a6)/a5=3.0/9.0

INTER-MODE LOSS DIFFERENCE COMPENSATOR AND OPTICAL AMPLIFIER

CROSS-REFERENCE TO RELATED APPLICATIONS

This application is a 371 U.S. National Stage of International Application No. PCT/JP2017/027858, filed Aug. 1, 2017, which claims priority to Japanese Patent Application Nos. 2016-153169, filed Aug. 3, 2016 and 2016-153996, filed Aug. 4, 2016. The disclosures of the above applications are incorporated herein by reference.

TECHNICAL FIELD

The present disclosure relates to a differential mode attenuation compensator that compensates a loss difference between modes in mode multiplexed transmission and an optical amplifier including the same.

BACKGROUND ART

In recent years, internet traffic is still increasing due to the diversity of services, and transmission capacity has been dramatically increasing due to an increase in the transmission speed and an increase in the number of multiplexed wavelengths by a wavelength division multiplexing (WDM) technique. Further, in recent years, it is expected that the transmission capacity will be further expanded by a digital coherent technique which has been extensively studied. In a digital coherent transmission system, frequency utilization efficiency has been improved by using multilevel phase modulation signals, but a higher signal-to-noise ratio is required. However, in a transmission system using a single mode fiber (SMF) in the related art, the transmission capacity is expected to saturate at 100 Tbit/sec as the boundary due to the input power limitation resulting from the nonlinear effect in addition to the theoretical limit, and it becomes difficult to further increase the capacity.

In order to further increase the transmission capacity in the future, a medium realizing innovative transmission capacity expansion is needed. Therefore, mode multiplexed transmission using multi mode fiber (MMF) that uses a plurality of propagation modes in an optical fiber as channels and can be expected to improve the signal-to-noise ratio and space utilization efficiency has been attracting attention. A higher-order mode propagating through the fiber has been the cause of signal deterioration, but active utilization is considered for development of digital signal processes and multiplexing/demultiplexing techniques (for example, see NPL 2).

In addition to the expansion of the transmission capacity, consideration is being made for long distance mode multiplexed transmission, and 527 km transmission using a non-coupling type 12-core fiber capable of three-mode propagation has been reported (for example, see NPL 3).

In long-distance mode multiplexed transmission, in order to perform long distance transmission, a differential modal attenuation (DMA) generated in a transmission line and a differential modal gain (DMG) generated in an optical amplifier become important. Even in NPL 3, the mode dependent loss (MDL) including DMA and DMG is adjusted to 0.2 dB or less per span in order to realize long distance transmission. In NPL 3, by giving the LP01 mode a loss larger than the LP11 mode by about 3 dB by using a spatial filter type differential mode attenuation compensator it contributes to the reduction of MDL.

CITATION LIST

Patent Literature

Non-Patent Literature

[NPL 1] N. Hanzawa et al., "Demonstration of Mode-Division multiplexing Transmission over 10 km Two-mode Fiber with Mode Coupler" OFC 2011, paper OWA 4
[NPL 2] T. Sakamoto et al., "Modal Dispersion Technique for Long-haul Transmission over Few-mode Fiber with SIMO Configurations" ECOC 2011, We. 10. P1.82
[NPL 3] K. Shibahara et al. "Dense SDM (12-Core×3-Mode) Transmission Over 527 km With 33.2-ns Mode-Dispersion Employing Low-Complexity Parallel MIMO Frequency-Domain Equalization", J. Ligh tw. Technol., vol. 34, no. 1 (2016).
[NPL 4] Nagase et al., "Characteristics of SC Type Optical Fixed Attenuator", Sociological Conference General Meeting C-5 99, 1989

SUMMARY OF THE INVENTION

Technical Problem

However, a spatial gain equalizer in NPL 3 needs a complicated structure including a lens, a filter for imparting loss to a specific mode, or the like, in addition to a fiber, and there is a problem that a precise alignment work for preventing generation of crosstalk between propagation modes is required.

Accordingly, an object of the present invention is to provide a differential mode attenuation compensator and an optical amplifier which are simple in construction and which do not require a precise alignment work.

As an attenuator using a simple structure used in the 1.3 μm or 1.5 μm band, a method of generating a loss by sandwiching a thin metal film between fibers and adding a metal such as cobalt to a core portion is proposed (see, for example, NPL 4). However, the method described in NPL 4 is directed to a single mode region, and an object of the present invention of giving a loss to each mode has not been achieved.

Solution to Problem

Specifically, a differential mode attenuation compensator according to the present invention includes a first multi-mode optical fiber and a third multi-mode optical fiber in which a plurality of propagation modes propagate in a wavelength of a propagating optical signal; and a second multi-mode optical fiber including a core and a clad and arranged with a central axis aligned between the first multi-mode optical fiber and the third multi-mode optical fiber, in which each loss in the plurality of propagation modes is different in the first multi-mode optical fiber and the third multi-mode optical fiber.

Refractive index distributions of the first multi-mode optical fiber and the third multi-mode optical fiber may be different from a refractive index distribution of the second multi-mode optical fiber.

In a case of cascading optical fibers having different refractive index distributions, if the state of the refractive index distribution of one optical fiber is changed, the amount of loss at the connection point is changed for each mode. Therefore, the differential mode attenuation compensator can reduce MDL by the following procedure.

First, the amount of loss in each mode of the entire optical transmission system for multimode transmission of an optical signal is recognized. The refractive index distribution of the second multi-mode optical fiber is set such that the amount of loss at the connection point is reduced for the mode in which the amount of loss is large and the amount of loss at the connection point is increased for the mode in which the amount of loss is small. By inserting a differential mode attenuation compensator having a second multi-mode optical fiber having such a refractive index distribution into the optical transmission system, the total amount of loss in each mode is equalized and MDL can be reduced.

The differential mode attenuation compensator is simple in the configuration and does not require precise alignment work only by aligning and cascading the central axes of the two types of optical fibers.

Therefore, the present invention can provide a differential mode attenuation compensator which is simple in construction and does not require precise alignment work.

The number of the plurality of propagation modes propagating through the first multi-mode optical fiber and the third multi-mode optical fiber may be 5 or less. The number of propagation modes propagating through the second multi-mode optical fiber may be 5 or more, and the refractive index distribution of the second multi-mode optical fiber may be a step type.

A second multi-mode optical fiber of the differential mode attenuation compensator according to the present invention is characterized in that the number of propagation modes in the wavelength of the propagating optical signal is 5 or more and the refractive index distribution is a step type. When the refractive index distribution of the second multi-mode optical fiber has a step shape, the amount of loss in the higher-order mode can be increased as compared with the fundamental mode.

The number of propagation modes propagating through the second multi-mode optical fiber may be 5 or more, and the core of the second multi-mode optical fiber may have a ring-shaped core portion having a ring-shaped refractive index distribution.

When the refractive index distribution of the second multi-mode optical fiber is a ring shape, the amount of loss in the higher-order mode can be reduced as compared with the fundamental mode.

In the second multi-mode optical fiber, the ratio of the inner ring diameter to the outer ring diameter of the ring-shaped core portion may be 0.1 or more.

The core of the second multi-mode optical fiber may have a region to which a transition element is added.

The configuration is simple and precise alignment work is unnecessary only by adjusting the region. Therefore, the present invention can provide an optical fiber which is simple in construction, does not require precise alignment work, and gives arbitrary loss for each mode.

The region may be ring-shaped.

It may be satisfied that $2.5-5.0 \times (a7-a6)/a5 \leq a6/a5 \leq 4.5-3.9 \times (a7-a6)/a5$, where a diameter of the core of the second multi-mode optical fiber is a5, an inner ring diameter of the region is a6, and an outer ring diameter of the region is a7.

By adjusting the region, the amount of loss in light changes for each mode. Therefore, the optical amplifier according to the present invention can reduce MDL by the following procedure.

First, the amount of loss in each mode of the entire optical transmission system for multimode transmission of an optical signal is recognized. The region of the optical fiber according to the present invention is set in such that the amount of loss is reduced for the mode in which the amount of loss is large and the amount of loss is increased for the mode in which the amount of loss is small. By inserting an optical fiber having such a region into the rear stage of the optical amplification unit, the total amount of loss in each mode is equalized, and MDL can be reduced.

The optical amplifier is simple in configuration and does not require precise alignment work only by aligning and cascading the central axes of the optical fibers of which regions are adjusted.

The optical amplifier includes an optical amplification unit that amplifies an optical signal propagating in a plurality of propagation modes, and the differential mode attenuation compensator, described in the above, arranged at the rear stage of the optical amplification unit in the propagation direction of the optical signal.

In the present optical amplifier, the differential mode attenuation compensator is arranged at the rear stage of the optical amplification unit, and it is possible to reduce MDL and prevent the noise figure from lowering.

Advantageous Effects of Invention

The present invention can provide a differential mode attenuation compensator and an optical amplifier which are simple in construction, do not require precise alignment work, and give arbitrary loss for each mode.

DESCRIPTION OF EMBODIMENTS

Figure 1:
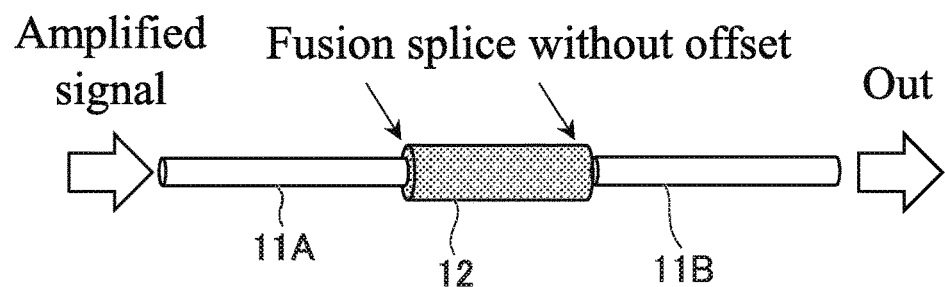
FIG. 1 is a schematic diagram for explaining a differential mode attenuation compensator according to the present invention.

Embodiments of the present invention will be described with reference to the accompanying drawings. The embodiments described below are examples of the present invention, and the present invention is not limited to the following embodiments. In addition, constituent elements having the identical reference numerals in the present specification and the drawings indicate mutually identical constituent elements.

First Embodiment

FIG. 1 is a schematic diagram of a differential mode attenuation compensator 101 according to the present embodiment. The differential mode attenuation compensator 101 includes a first multi-mode optical fiber 11A (hereinafter referred to as an optical fiber 11A), a third multi-mode optical fiber 11B (hereinafter referred to as an optical fiber 11B), and a second multi-mode optical fiber 12 (hereinafter referred to as an optical fiber 12). The optical fiber 11A includes a core 13 and a clad 14. The optical fiber 11B includes a core 13 and a clad 14. A plurality of propagation modes propagate in the optical fiber 11A and the optical fiber 11B in a wavelength of a propagating optical signal.

The second multi-mode optical fiber 12 includes a core 15 and a clad 16, and are arranged with a central axis aligned between the first multi-mode optical fiber 11A and the third multi-mode optical fiber 11B.

Further, each loss in the plurality of propagation modes is different in the optical fiber 11A and the optical fiber 11B. In other words, the loss in the propagation mode propagating through the optical fiber 11A is different from the loss in the propagation mode that passes from the optical fiber 11A through the optical fiber 12 and propagates through the optical fiber 11B.

In the present embodiment, an optical fiber in which the number of propagation modes of the optical fiber 11A and the optical fiber 11B is 5 or less is used, but the present invention is not limited thereto.

Figure 2:
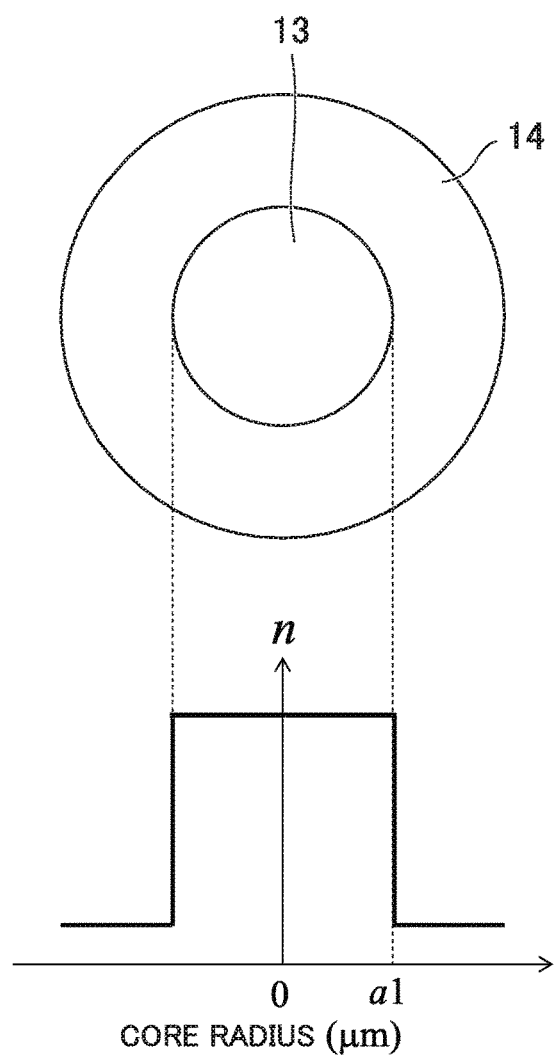
FIG. 2 is a diagram for explaining refractive index profiles of first and third multi-mode optical fibers of the differential mode attenuation compensator according to the present invention.
Figure 3:
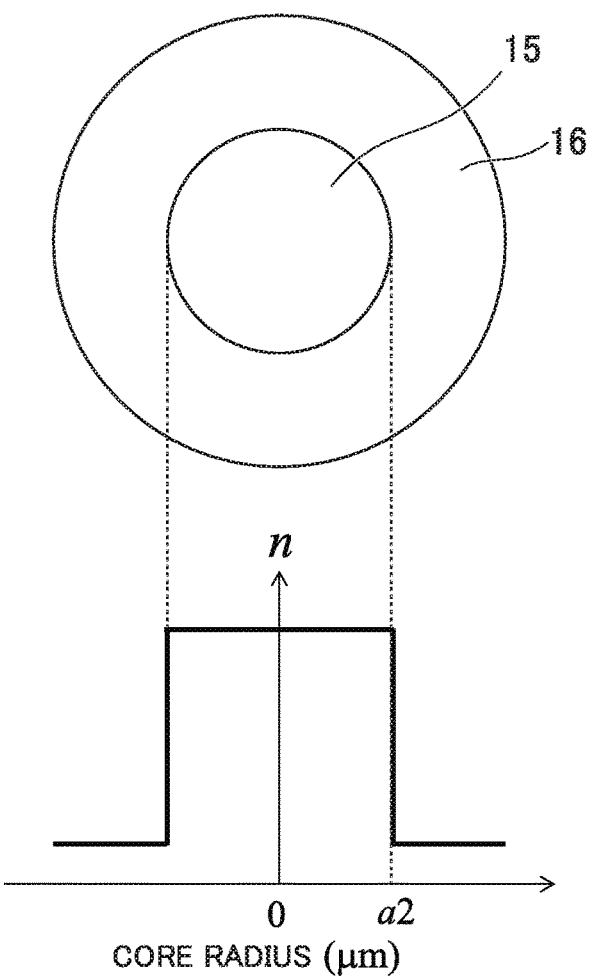
FIG. 3 is a diagram for explaining refractive index profiles of a second multi-mode optical fiber of the differential mode attenuation compensator according to the present invention.

The differential mode attenuation compensator 101 is configured by cascading two types of multimode fibers, that is, the optical fiber 11A, the optical fiber 12, and the optical fiber 11B in this order. FIG. 2 shows the refractive index profiles of the optical fibers 11A, 11B, and FIG. 3 shows the refractive index profile of the optical fiber 12. As shown in FIGS. 2 and 3, the refractive index distributions of the optical fibers 11A, 11B and the optical fiber 12 are different. The optical fibers 11A and 11B are the same type of optical fibers and have the same refractive index distribution. The core radii of the optical fiber 11A and the optical fiber 11B is a1, and the relative refractive index differences Δ are Δ1. The core radius of the optical fiber 12 is a2, and the relative refractive index difference is Δ2.

Here, an embodiment with a step shape is shown, but regarding the effect, it can be considered similarly for other refractive index shapes.

The differential mode attenuation compensator 101 realizes reduction of MDL by utilizing the fact that the electric field distributions of the propagation modes propagating through the optical fibers 11A, 11B and the optical fiber 12 are different. In a case where the number of propagation modes in the optical transmission system is N, if the number of propagation modes is M or less (M<N), the optical fiber 12 used here is such that part of the propagation modes is cut off and is not transmitted, it is desirable that the number of propagation modes is N or more.

Moreover, crosstalk between propagation modes is a concern in the method of cascading two different types of optical fibers. Considering the LPlm mode (l defines a circumferential direction mode and m defines a radial direction mode), even in the case where there is no axis deviation at the connection point for the modes with the identical circumferential direction mode order and the identical radial direction mode order, there may theoretically be inter-mode crosstalk.

Here, in order to avoid the influence of inter-mode crosstalk, the modes to be considered are five modes of LP01, LP11a, LP11b, LP21a, and LP21b modes. The LP11a and LP11b, and the LP21a and LP21b represent degenerate modes. In the degenerate mode, in a case where there is no axial deviation from the shape of the electric field distribution at the connection point, the connection loss has a similar value. Therefore, hereinafter, the LP11a and LP11b are collectively described as LP11 modes. The LP21a and LP21b are collectively described as LP21 modes.

Figure 4:
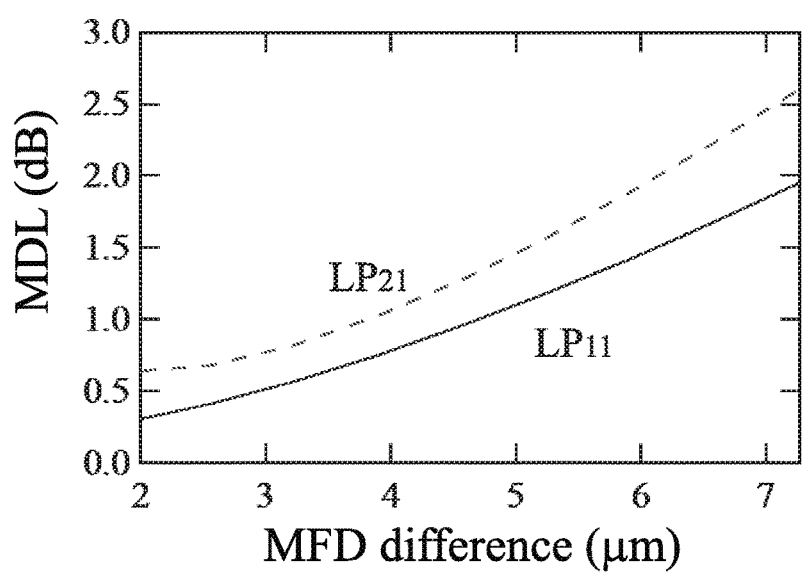
FIG. 4 is a diagram for explaining a relationship between an MFD difference (LP01 mode) and an MDL of the first multi-mode optical fiber and the second multi-mode optical fiber.

The MDL of the differential mode attenuation compensator 101 is calculated and examined. Here, the core radii of the optical fibers 11A, 11B are 7 μm, and the relative refractive index difference Δ is 0.7%. The effect of the difference between the mode field diameters (MFD) of the LP01 modes of the optical fibers 11A, 11B and the LP01 mode of the optical fiber 12 on the MDL between the LP11 mode and the LP21 mode is calculated. The results are shown in FIG. 4. In this example, the optical fiber 12 is step shaped, and the relative refractive index difference Δ is fixed to 0.45%. The MDL shown in FIG. 4 represents the loss differences in the LP11 and LP21 modes with respect to the LP01 mode.

As shown in FIG. 4, it can be checked that the value of MDL can be adjusted by adjusting the MFD difference. Further, as described above, in the connection using two different step shapes, the mismatch of the electric field distribution of the higher-order mode becomes large, such that it is known that the loss in the higher-order mode becomes higher than in the fundamental mode. Since the MFD of the LP01 mode can be adjusted by the core radius, FIG. 4 shows that the difference in loss between modes can be arbitrarily set, by adjusting the refractive index distributions of the optical fibers 11A, 11B and the optical fiber 12.

Figure 5:
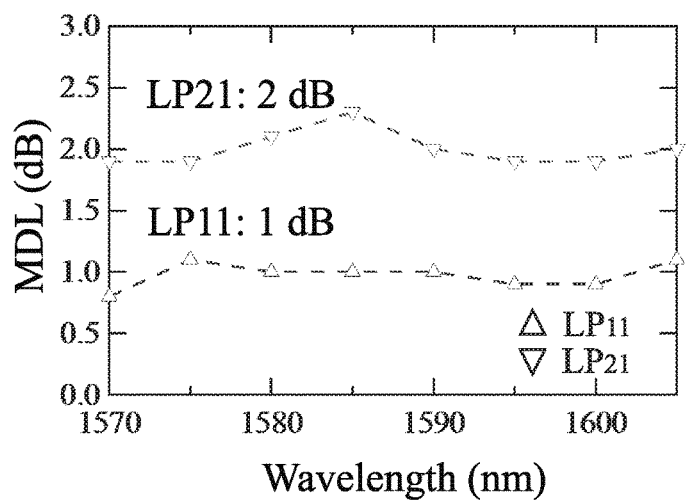
FIG. 5 is a diagram for explaining a relationship between the MDL and the wavelength of the differential mode attenuation compensator according to the present invention.

Next, the relationship between the MDL and the wavelength in the differential mode attenuation compensator actually fabricated is shown in FIG. 5. There is a stepped fiber in which the radius of the core 13 of each of the optical fibers 11A, 11B are 7 μm, and the relative refractive index difference Δ is 0.7%, and a stepped fiber in which the radius of the core 15 of the optical fiber 12 is 10.5 μm, and the relative refractive index difference Δ is 0.45%. From FIG. 5, MDL of 2 dB is generated in the LP21 mode and MDL of about 1 dB is generated in the LP11 mode. Since the change in the electric field distribution has small wavelength dependence, it can be checked that the wavelength dependence of MDL is also small.

In the present embodiment, an example with five modes is shown, but similarly, it is possible to form a differential mode attenuation compensator capable of obtaining desired MDL even in an optical fiber propagating in 5 or less modes by estimating the relationship between the MFD difference and MDL.

Second Embodiment

In the present embodiment, a method of giving a large loss to the fundamental mode (LP01 mode) as compared with the higher-order mode (LP11 and LP21 modes) will be described. In the present embodiment, an optical fiber having a ring-shaped refractive index shape giving a larger connection loss to the LP01 mode than a higher-order mode is applied to the optical fiber 12 of the differential mode attenuation compensator 101 of FIG. 1. In the optical fiber 12 of the present embodiment, the number of propagation modes in the wavelength of the propagating optical signal is 5 or more, and the optical fiber 12 has a ring-shaped core whose refractive index distribution is ring-shaped.

Figure 6:
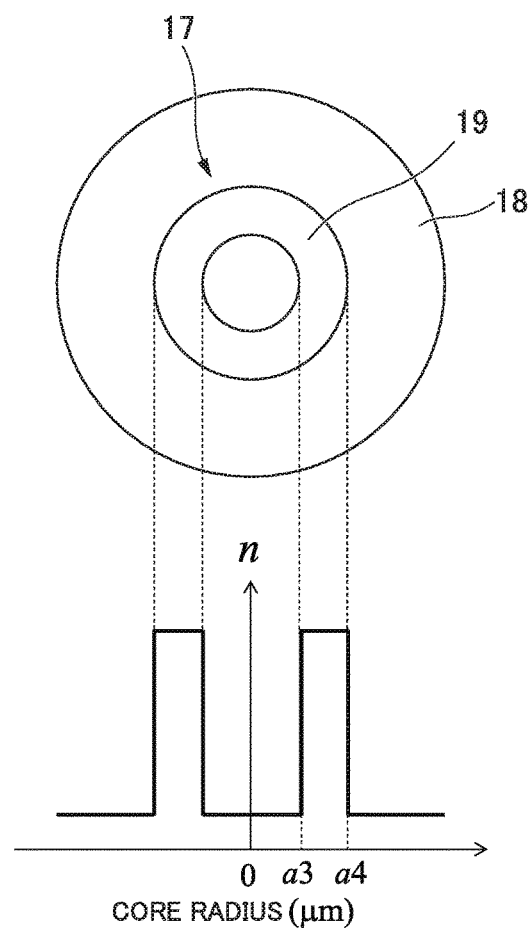
FIG. 6 is a diagram for explaining a refractive index profile of the second multi-mode optical fiber of the differential mode attenuation compensator according to the present invention.

FIG. 6 shows the refractive index profile of the optical fiber 12. As shown in FIG. 6, the optical fiber 12 has a core 17 and a clad 18. The core 17 includes a ring-shaped core portion 19 having a ring-shaped refractive index distribution. The core 17 has an inner ring portion having a radius a3 of which refractive index is identical to that of the clad 18 and an outer ring portion having a relative refractive index difference Δ4 in the region of a3 to a4. Incidentally, the optical fibers 11A and 11B of the present embodiment have step-type refractive index profiles, the core radius is 7 μm, and the relative refractive index difference Δ4 is 0.7%.

Figure 7:
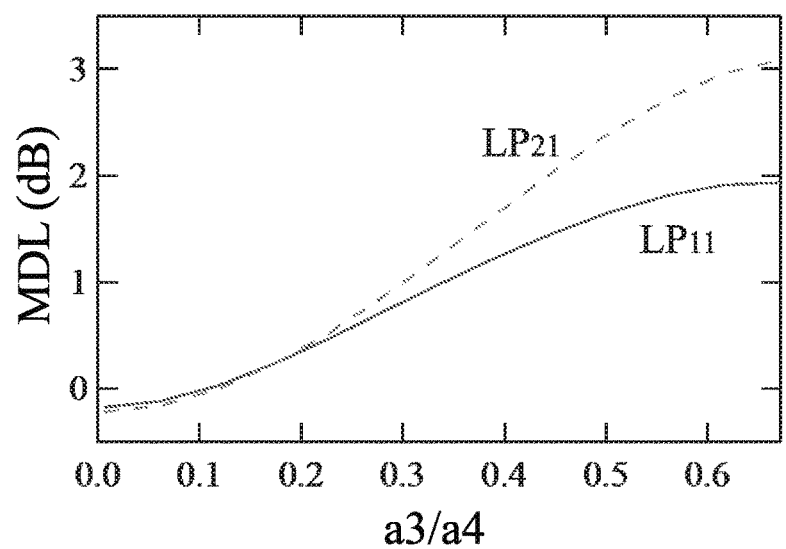
FIG. 7 is a diagram for explaining a relationship between a ratio of an inner ring diameter a3 to an outer ring diameter a4 of the second multi-mode optical fiber and MDL.

FIG. 7 is a diagram for explaining a relationship between a3/a4 and MDL, in the differential mode attenuation compensator 101 including the optical fibers 11A and 11B and the optical fiber 12 having the profile of FIG. 6. Here, the inner ring diameter a3 is set as a variable, and a4 is fixed to 9 μm. Unlike the case where the optical fiber 12 according to the first embodiment is provided, in the region of a3/a4≥0.1, as a3/a4 increases, the connection losses in the LP11 and LP21 modes become larger with respect to the LP01 mode.

In the present embodiment, an example with five modes is shown, but similarly, it is possible to form a differential mode attenuation compensator capable of obtaining a desired MDL even in an optical fiber propagating in 5 or less modes by estimating the relationship between a3/a4 and MDL.

As described in the first embodiment and second embodiment, it is possible to generate the MDL according to the mismatch of the electric field distributions between the fibers by optimally designing the refractive index profiles of the optical fibers 11A, 11B and the optical fiber 12, and it is possible to reduce the total MDL by arranging the differential mode attenuation compensator 101 in the optical transmission system.

Third Embodiment

Figure 8:
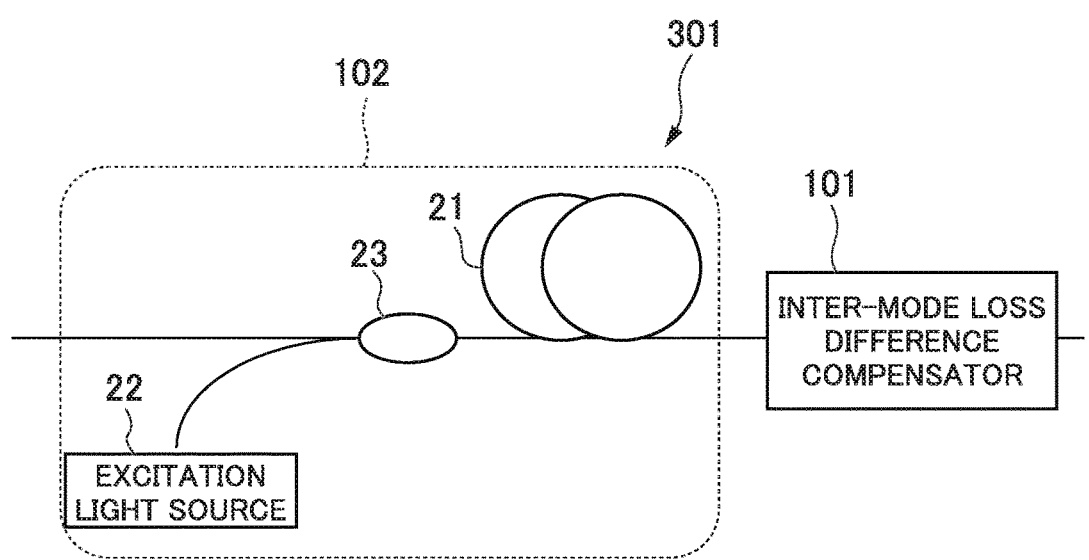
FIG. 8 is a configuration diagram illustrating an optical amplifier according to the present invention.

FIG. 8 is a configuration diagram for explaining an optical amplifier 301 according to the present embodiment. The optical amplifier 301 includes an optical amplification unit 102 that amplifies an optical signal propagating in a plurality of propagation modes, and the differential mode attenuation compensator 101 arranged at the rear stage of the optical amplification unit 102 in the propagation direction of the optical signal.

In the present embodiment, the differential mode attenuation compensator 101 described in the first embodiment and second embodiment is used together with the optical amplification unit 102 capable of N mode propagation and having a gain difference for each mode. The optical amplification unit 102 includes an amplification fiber 21, an excitation light source 22, and a signal light excitation light multiplexer 23. Generally, when the differential mode attenuation compensator 101 is installed in the front stage of the optical amplification unit 102, the noise figure decreases, so it is preferable to install the differential mode attenuation compensator 101 at a rear stage of the optical amplification unit 102 or between the plurality of optical amplification units 102.

By designing the refractive index profile of the optical fiber 12 so as to give a large loss to the mode giving a large gain in the optical amplification unit 102, the inter-mode gain difference of the optical amplifier 301 can be reduced.

(Effect)

According to the present invention, since the spatial optical element is not used, simplification of the configuration can be expected, and since connection may be fusion splice or butt splice in the related art, it becomes possible to easily compensate for the differential mode attenuation. In this manner, by realizing a reduction in the differential mode attenuation in mode multiplexed transmission, it contributes to lengthening the transmission distance.

Appendix

The following is a method of reducing MDL in an optical transmission system performing mode multiplexed transmission.

(1) A differential mode attenuation compensation method for reducing a differential mode attenuation in an optical transmission system in which the number of propagation modes of an optical signal is 2 or more and 5 or less, the differential mode attenuation compensation method including:

a measurement procedure for measuring the amount of loss in each propagation mode;

a structure determination procedure for determining the refractive index distribution of the second multi-mode optical fiber such that the amount of loss in each propagation mode in a differential mode attenuation compensator including a first multi-mode optical fiber having the number of propagation modes of 5 or less in a wavelength of a propagating optical signal, and a second multi-mode optical fiber inserted into the first multi-mode optical fiber with a central axis aligned therewith, and having a refractive index distribution different from the first multi-mode optical fiber is inversely proportional to the amount of loss in each propagation mode measured in the measurement procedure; and an installation procedure for arranging the differential mode attenuation compensator including the second multi-mode optical fiber with the refractive index distribution determined in the structure determination procedure in a rear stage of the optical amplification unit of the optical transmission system in the propagation direction of the optical signal.

(2): The differential mode attenuation compensation method according to the above (1), for the second multi-mode optical fiber of the differential mode attenuation compensator, the number of propagation modes is 5 or more in the wavelength of the propagating optical signal, and in the structure determination procedure, the refractive index distribution of the second multi-mode optical fiber set as a step type.

(3): The differential mode attenuation compensation method according to the above (1), for the second multi-mode optical fiber of the differential mode attenuation compensator, the number of propagation modes is 5 or more in the wavelength of the propagating optical signal, and in the structure determination procedure, the refractive index distribution of the second multi-mode optical fiber is formed into a ring shape to form a ring-like core.

(4): The differential mode attenuation compensation method according to the above (3), a ratio of an inner ring diameter to an outer ring diameter of the ring-shaped core of the second multi-mode optical fiber is 0.1 or more.

Embodiments of the present invention will be described with reference to the accompanying drawings. The embodiments described below are examples of the present invention, and the present invention is not limited to the following embodiments. The same reference numerals in the present specification and drawings denote the same constituent elements.

Fourth Embodiment

Figure 9:
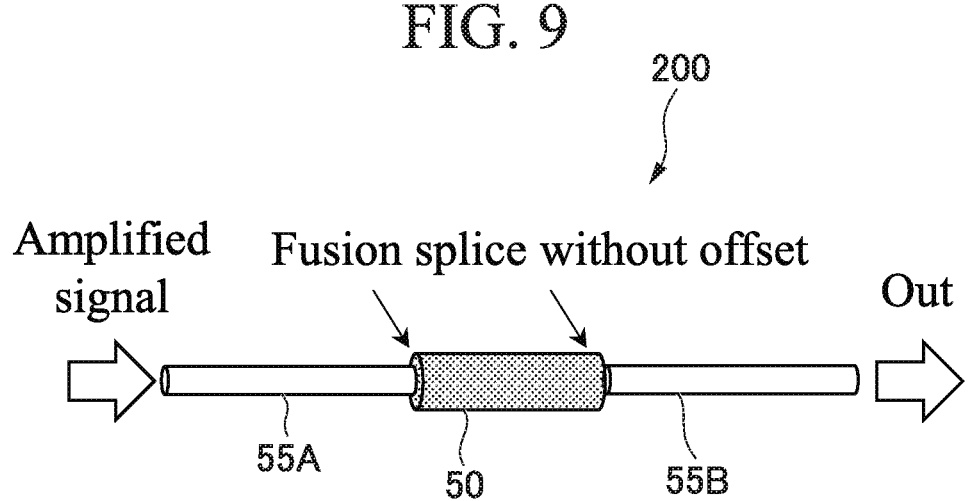
FIG. 9 is a diagram for explaining an example of arranging an optical fiber according to the present invention in a transmission line.

FIG. 9 is a schematic diagram of a differential mode attenuation compensator 200 according to the present embodiment. In the differential mode attenuation compensator 200, an optical fiber (a second multi-mode optical fiber) 50 is inserted with the central axis aligned between an optical fiber (a first multi-mode optical fiber) 55A and an optical fiber (a third multi-mode optical fiber) 55B.

Figure 10:
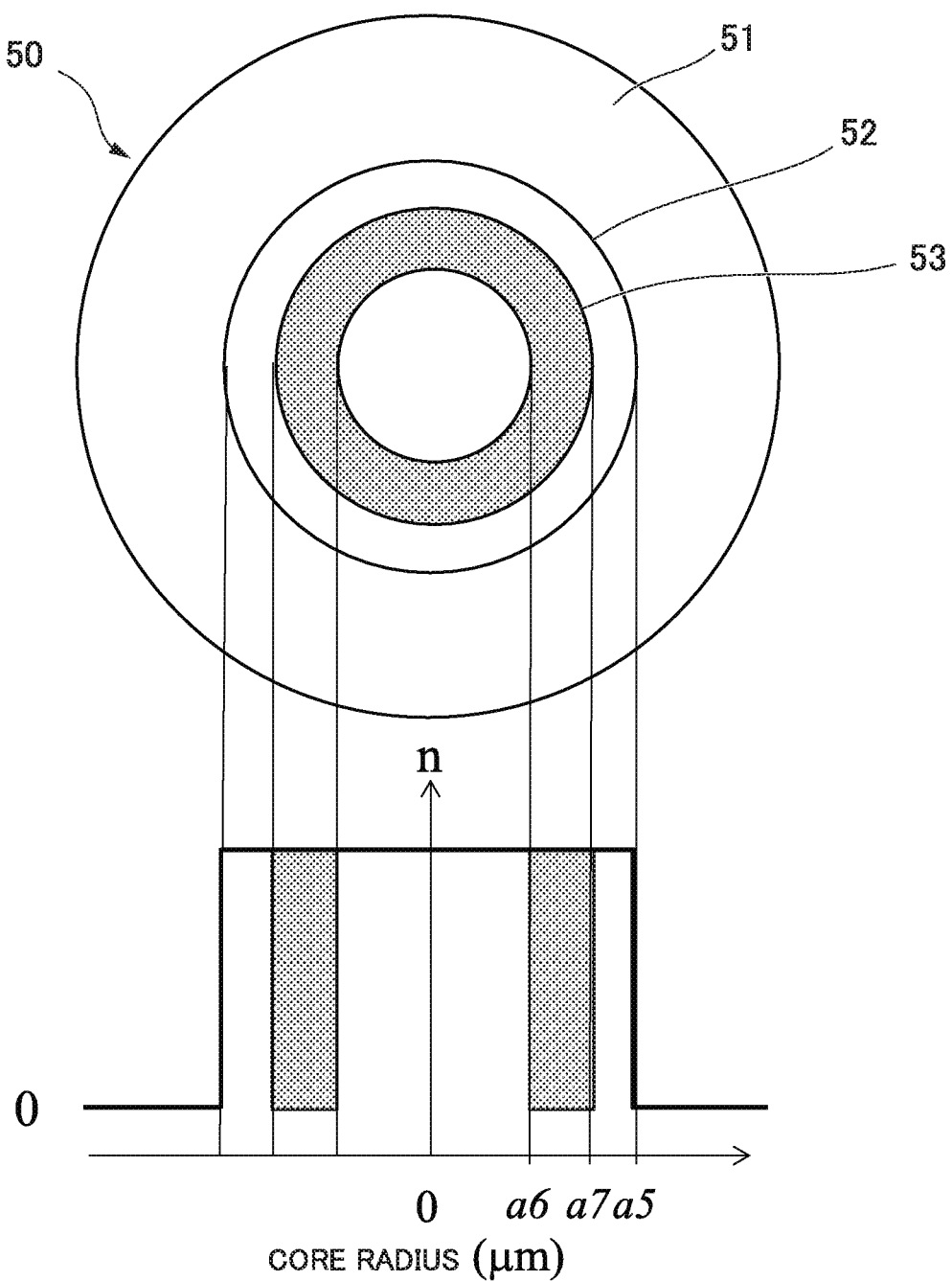
FIG. 10 is a diagram for explaining a structure of the optical fiber according to the present invention.
Figure 11:
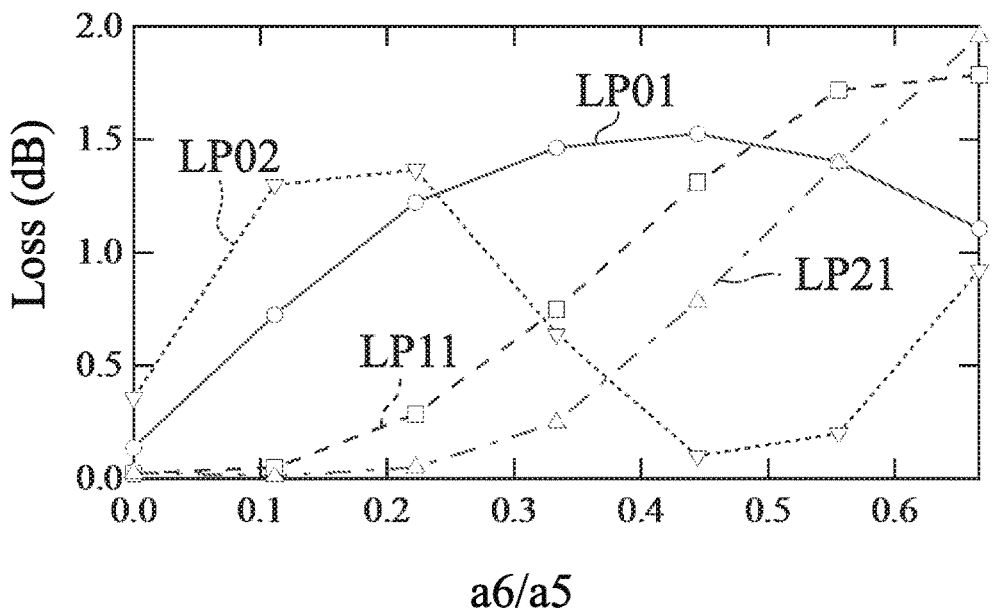
FIG. 11 is a diagram for explaining a relationship between a loss in each propagation mode and a6/a5 in (a7−a6)/a5=0.5/9.0 in the optical fiber according to the present invention.
Figure 12:
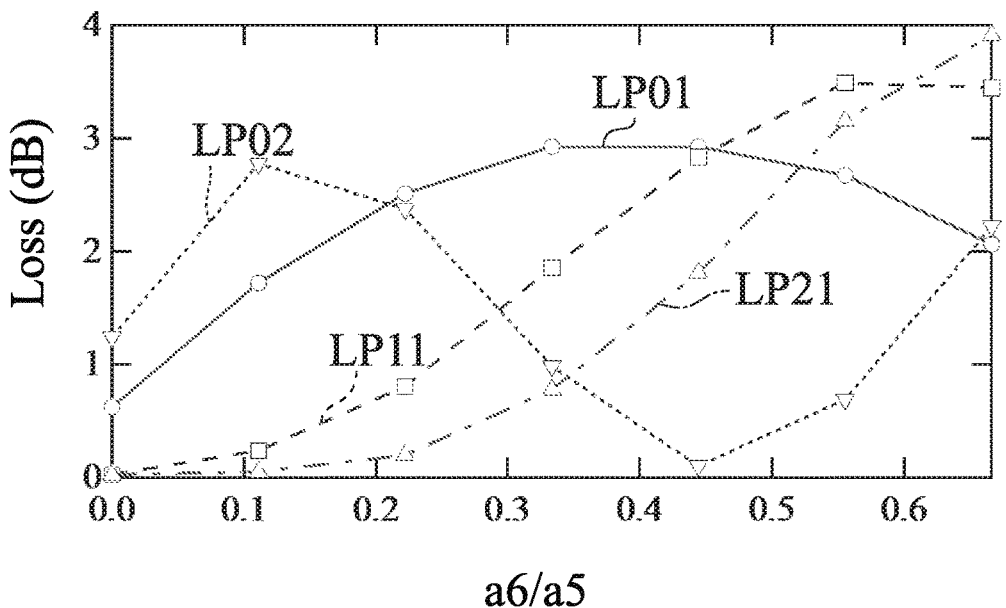
FIG. 12 is a diagram for explaining a relationship between a loss in each propagation mode and a6/a5 in (a7−a6)/a5=1.0/9.0 in the optical fiber according to the present invention.
Figure 13:
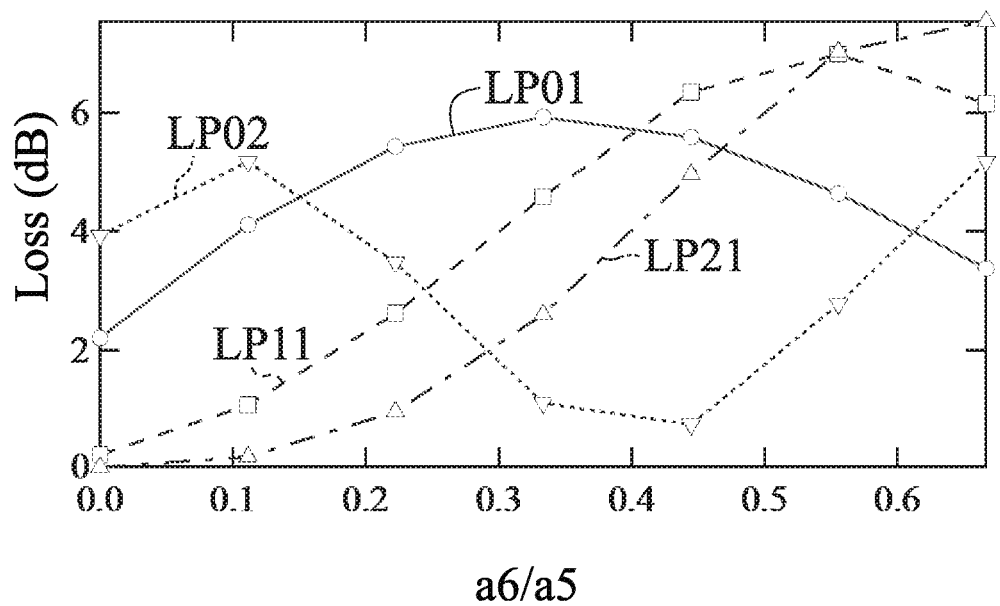
FIG. 13 is a diagram for explaining a relationship between a loss in each propagation mode and a6/a5 in (a7−a6)/a5=2.0/9.0 in the optical fiber according to the present invention.
Figure 14:
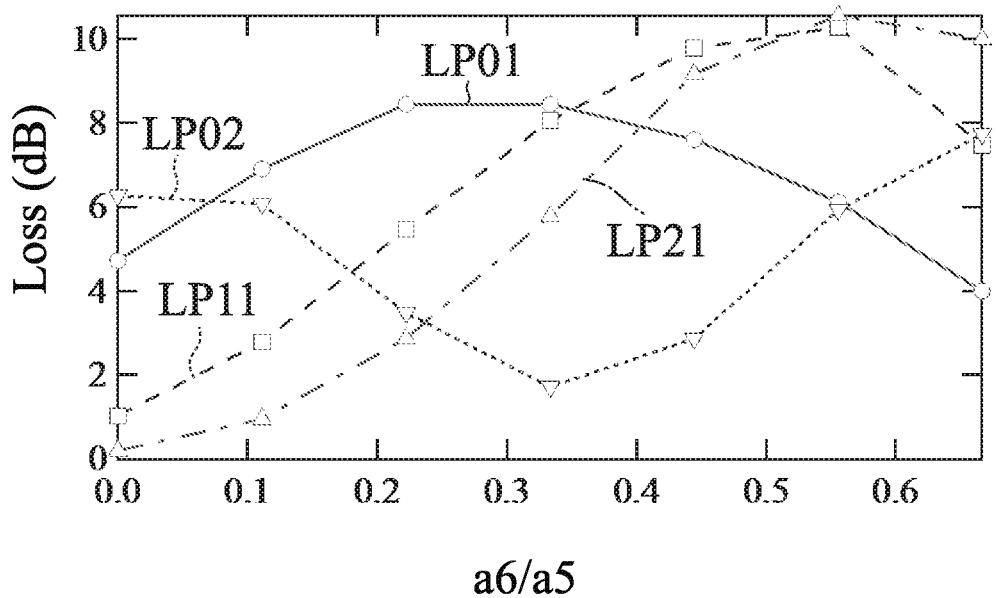
FIG. 14 is a diagram for explaining a relationship between a loss in each propagation mode and a6/a5 in (a7−a6)/a5=3.0/9.0 in the optical fiber according to the present invention.

FIG. 10 is a view for explaining a transition element profile of the optical fiber 50 of the present embodiment. The optical fiber 50 includes a clad 51 and a core 52 and is an optical fiber having a plurality of numbers of propagation modes in the wavelength of propagating light. The core region (core) 52 has a region 53 partially added with a transition element, and it is possible to generate a loss in each propagation mode. The region 53 is ring-shaped.

The radius of the core region 52 is a5, and the relative refractive index difference $\Delta$ is $\Delta 5$. Here, an example with a step shape is shown, but regarding the effect, it can be considered similarly for other refractive index shapes. In addition, FIG. 10 shows a region 53 where a transition element is added to a part of the core region 52. The region 53 is a range of the radius a6 to a7 ($0 \leq a6 \leq a7 \leq a5$) in the core region 52.

The transition element added to the region 53 is a metal element such as cobalt, iron, nickel, lead or the like. The propagation loss around the unit length of the propagation mode propagating through the optical fiber 50 can be adjusted by changing the addition concentration of the transition element as needed.

Subsequently, it will be described that large propagation loss can be generated in a specific mode propagating through the optical fiber by adding metal only to a part of the core region 52 as described above. Here, the relationship between the region 53 and the propagation loss in each propagation mode is calculated. A beam propagation method (BPM) is used to calculate the propagation loss, and an absorption coefficient k is set in the region 53 so as to be absorbed and attenuated during propagation. In this example, propagation modes are LP01, LP1, LP21, and LP02 modes. A calculation can be made in the same way even in an optical fiber in which more modes propagate.

FIG. 11, FIG. 12, FIG. 13, and FIG. 14 are diagrams illustrating a relationship between loss in each propagation mode and a6/a5 when (a7−a6)/a5 is 0.5/9.0, 1/9, 2/9, and 3/9, respectively. Here, a5=9 μm and k=0.5×10−5, and the propagation length is 10 mm. The propagation loss due to the optical fiber 50 is determined by k and the propagation length, and the characteristic difference between modes does not depend largely on the value of k. In this calculation, only the amount of absorption is defined, and in the calculation for a specific metal, the type, the added concentration and the added region of a metal added to the metal-doped fiber can be calculated in the same way.

It can be checked that the value of loss generated by the optical fiber 50 differs for each mode according to the value of a6/a5. For example, it becomes possible to design the region where (a7−a6)/a5 is 0.5/9.0 and a6/a5 is about 0.38 to 0.48 such that a small loss is given as the mode order increases from the fundamental mode.

Generally, in the multi-mode optical fiber, the confinement of the fundamental mode tends to become stronger and the propagation loss including the bending loss becomes smaller as compared with the higher-order mode. Therefore, in order to reduce the MDL in the mode multiplexing optical transmission system, it is preferable that excess loss which is larger than in the higher-order mode is given to the fundamental mode in the optical fiber 50. The range of the region 53 of such an optical fiber 50 will be checked from the results of FIGS. 11 to 14.

Figure 15:
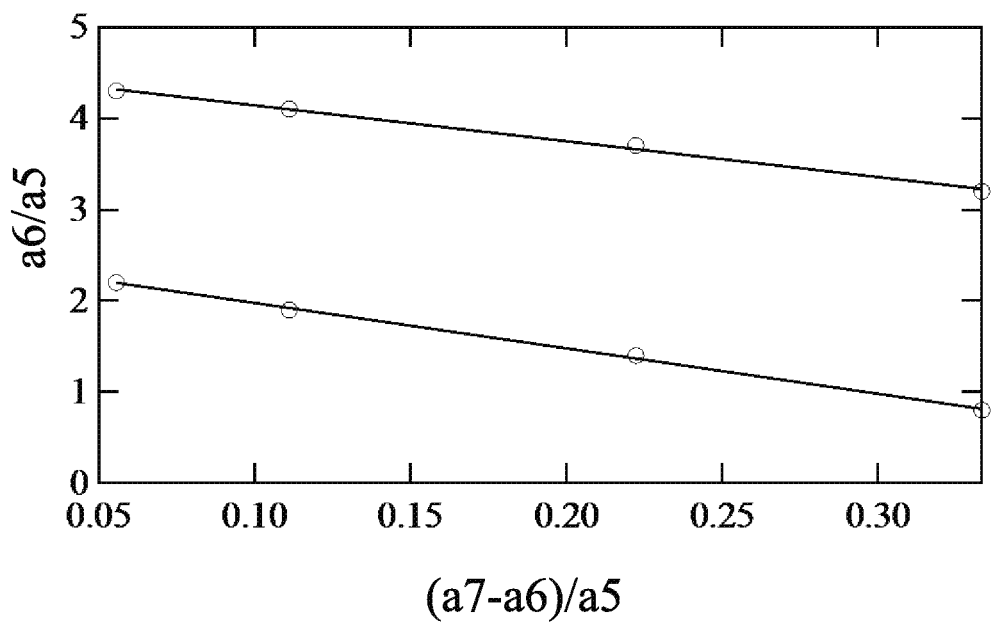
FIG. 15 is a diagram for explaining a region where the loss in the fundamental mode in the optical fiber according to the present invention is larger than the loss in the higher-order mode.

FIG. 15 is the result of plotting (a7−a6)/a5 on a horizontal axis and a6/a5 on a vertical axis with respect to a region in which the loss in the LP01 mode is larger than the losses in the LP11, LP21, LP02 modes. It can be checked that the range of a6/a5, in which the loss in the fundamental mode is larger than the loss in the higher-order mode, is determined by the value of the ring width (a7−a6)/a5. Specifically, the loss in the fundamental mode is larger than the loss in the higher-order mode by adding a metal in the region 53 which satisfies $2.5-5.0 \times (a7-a6)/a5 \leq a6/a5 \leq 4.5-3.9 \times (a7-a6)/a5$.

In the present embodiment, an example in which the region 53 to which the transition element is added is shown as a ring shape has been described, but it is also possible to give a loss by considering the addition distribution such as changing the addition concentration to a stepwise type.

Fifth Embodiment

Figure 16:
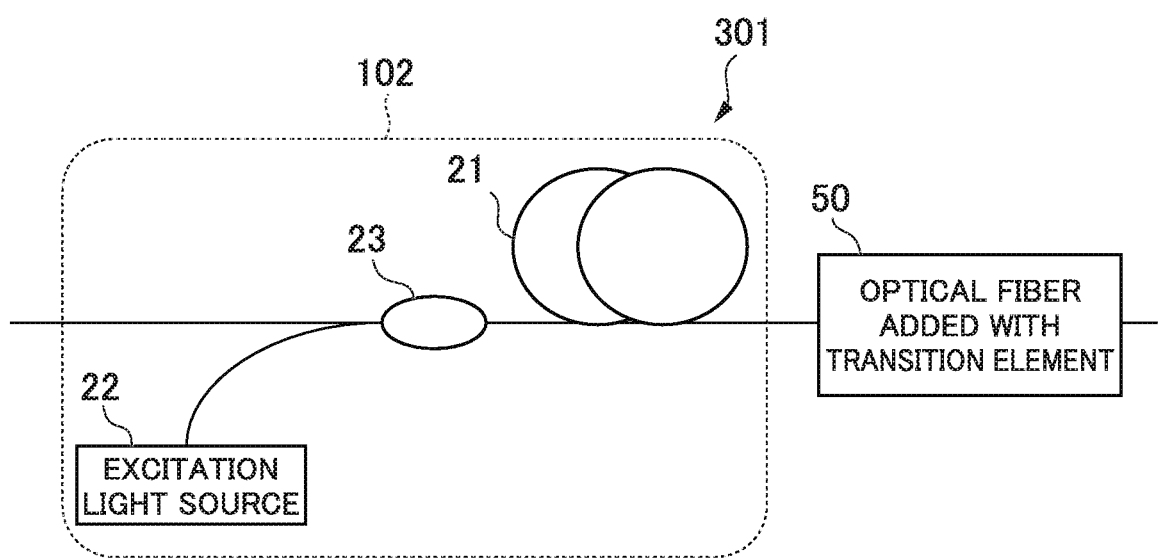
FIG. 16 is a diagram for explaining an optical amplifier according to the present invention.

FIG. 16 is a diagram for explaining the optical amplifier 301 of the present embodiment. The optical amplifier 301 includes an optical amplification unit 102 that amplifies an optical signal propagating in a plurality of propagation modes, and an optical fiber 50 arranged at the rear stage of the optical amplification unit 102 in the propagation direction of the optical signal.

In the present embodiment, the optical fiber 50 described in the fourth embodiment is used together with the optical amplification unit 102 capable of N mode propagation and having a gain difference for each mode. The optical amplification unit 102 includes an amplification fiber 21, an excitation light source 22, and a signal light excitation light multiplexer 23. Generally, when the optical fiber 50 is installed in the front stage of the optical amplification unit 102, the noise figure decreases, so it is preferable to install the optical fiber 50 at a rear stage of the optical amplification unit 102 or between the plurality of optical amplification units 102.

By designing the region 53 of the optical fiber 50 so as to give a large loss to the mode giving a large gain in the optical amplification unit 102, the inter-mode gain difference of the optical amplifier 301 can be reduced.

Next, a method of designing the amount of loss generated in the optical fiber 50 when cascading the amplification fiber 21 and the optical fiber 50 will be described. Here, an optical amplifier capable of amplifying the LP01, LP11, LP21, LP02 modes propagating through the optical transmission line will be described as an example.

The amplification fiber 21 is an erbium-doped fiber (EDF) to which erbium is added. The refractive index distribution of the EDF is a step type with a core radius of 7 μm and a relative refractive index difference of 0.7%, the added amount of erbium is uniformly 300 ppm, and the strip length is 10 m.

When the gain is calculated with the wavelength of the signal light being 1550 nm, the wavelength of the excitation light being 980 nm and the mode of the excitation light being the LP11 mode, the gain of each propagation mode is 20.0 dB for LP01, 20.0 dB for LP11, 16.9 dB for LP21, and 10.6 dB for LP02.

When $(a7-a6)/a5=1$ μm and the strip length is 30 mm in the optical fiber 50, the loss in each mode generated in the optical fiber 50 as shown in FIGS. 11 to 14 has periodically different values depending on the value of $a6/a5$. The gain of the optical amplifier 301 can be obtained from the $a6/a5$ dependence of the gain generated in the optical amplification unit 102 and the loss generated in the optical fiber 50.

Figure 17:
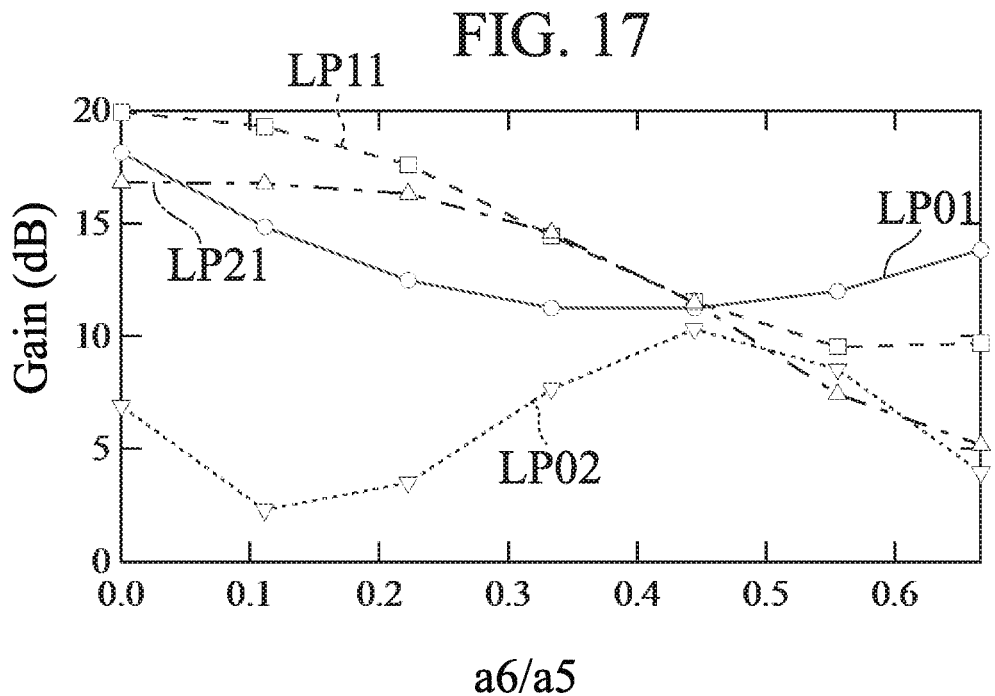
FIG. 17 is a diagram illustrating a DMG of the optical amplifier according to the present invention.

FIG. 17 is a diagram for explaining the relationship between the gain of the optical amplifier 301 and $a6/a5$ of the optical fiber 50. The absolute value of the gain of each propagation mode of the whole optical amplifier 301 can be set to a desired value by adjusting the excitation intensity and the strip length of the EDF. From FIG. 17, it can be checked that DMG becomes the smallest when $a6/a5$ is about 0.44.

Figure 18:
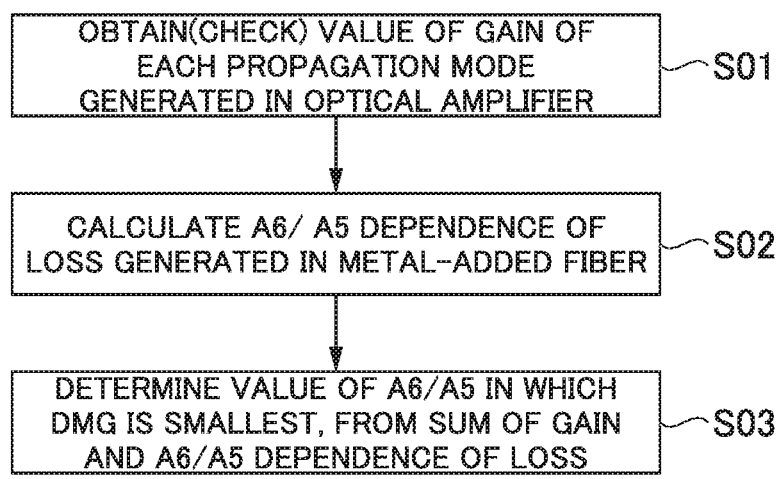
FIG. 18 is a diagram for explaining a procedure for designing the optical fiber according to the present invention.

FIG. 18 is a diagram for explaining a designing method of the optical fiber 50 applied to the optical amplifier 301. The designing method of FIG. 18 is a method of reducing a differential mode attenuation in the optical amplifier 301 in which the number of propagation modes of an optical signal is plural, and includes a measurement procedure S01 of measuring the gain of each propagation mode generated in the optical amplification unit 102, a calculation procedure S02 of calculating the dependence of the structure of the region 53 to which a transition element is added in part of the core region 52 in the optical fiber 50 and the amount of loss in each propagation mode, and a determination procedure S03 of adding the gain measured in the measurement procedure S01 and the loss calculated in the calculation procedure S02 for each propagation mode and determining the structure of the region 53 where the DMG is the smallest.

In addition, even in the case where the optical fiber 50 is arranged in the transmission line of the optical transmission system, the same design can be performed.

(Effect)

According to the present invention, since the spatial optical element is not used, simplification of the configuration can be expected, and since connection may be fusion splice or butt splice in the related art, it becomes possible to easily compensate for the differential mode attenuation. In this manner, by realizing a reduction in the differential mode attenuation in mode multiplexed transmission, it contributes to lengthening the transmission distance.

Appendix

The following describes a method of reducing MDL in an optical transmission system that performs mode multiplexed transmission.

(1) A differential mode attenuation compensation method for reducing a differential mode attenuation in an optical transmission system having a plurality of optical signal propagation modes, the method including:

a measurement procedure for measuring the amount of loss in each propagation mode;

a calculation procedure of calculating a relationship between a loss amount in each propagation mode and a structure of the region for an optical fiber having a region to which a transition element is added in a part of the core; and a determination procedure of adding the loss measured in the measurement procedure and the loss calculated in the calculation procedure for each propagation mode, and determining a structure of the region where the MDL is minimized.

(2): The differential mode attenuation compensation method according to the above (1), wherein the structure of the region of the optical fiber is ring-shaped.

(3): The differential mode attenuation compensation method according to the above (2), in which the structure of the region determined in the determination procedure satisfies that $2.5-5.0\times(a7-a6)/a5 \leq a6/a5 \leq 4.5-3.9\times(a7-a6)/a5$, when a diameter of the core is $a5$, an inner ring diameter of the region is $a6$, and an outer ring diameter of the region is $a7$.

Although preferred embodiments of the present invention have been described above, the present invention is not limited to these embodiments and modification examples thereof. Additions, omissions, substitutions, and other changes in the structure are possible without departing from the spirit of the present invention.

The present invention is not limited by the foregoing description, but only by the scope of the appended claims.

INDUSTRIAL APPLICABILITY

The present invention can provide a differential mode attenuation compensator and an optical amplifier which are simple in construction, do not require precise alignment work, and give arbitrary loss for each mode.

REFERENCE SIGNS LIST $a5$: CORE DIAMETER
$a6$: INNER RING DIAMETER
$a7$: OUTER RING DIAMETER 11A, 55A: OPTICAL FIBER (FIRST MULTI-MODE OPTICAL FIBER)
11B, 55B: OPTICAL FIBER (THIRD MULTI-MODE OPTICAL FIBER)
12, 50: OPTICAL FIBER (SECOND MULTI-MODE OPTICAL FIBER)
21: AMPLIFICATION FIBER
22: EXCITATION LIGHT SOURCE
23: SIGNAL LIGHT EXCITATION LIGHT MULTIPLEXER
101, 200: DIFFERENTIAL MODE ATTENUATION COMPENSATOR
102: OPTICAL AMPLIFICATION UNIT
301: OPTICAL AMPLIFIER

The invention claimed is:

1. A differential mode attenuation compensator, comprising:
a first multi-mode optical fiber and a third multi-mode optical fiber in which a plurality of propagation modes propagate in a wavelength of a propagating optical signal; and
a second multi-mode optical fiber including a core and a clad, and arranged with a central axis aligned between the first multi-mode optical fiber and the third multi-mode optical fiber, wherein the core of the second multi-mode optical fiber has a region to which a transition element is added,
wherein refractive index distributions of the first multi-mode optical fiber and the third multi-mode optical fiber are different from a refractive index distribution of the second multi-mode optical fiber,
wherein concentration of the transition element in the region creates a stepwise change in refractive index exhibited in the core, and the refractive index distribution of the second multi-mode optical fiber is set such that an amount of loss at a connection point of the second multi-mode optical fiber and the first or third multi-mode optical fiber is reduced for the mode in which an amount of loss is large and the amount of loss at the connection point is increased for the mode in which the amount of loss is small.

2. The differential mode attenuation compensator according to claim 1,
wherein the region is ring-shaped.

3. The differential mode attenuation compensator according to claim 2,
wherein it is satisfied that $2.5-5.0\times(a7-a6)/a5 \leq a6/a5 \leq 4.5-3.9\times(a7-a6)/a5$, where a diameter of the core of the second multi-mode optical fiber is $a5$, an inner ring diameter of the region is $a6$, and an outer ring diameter of the region is $a7$.

4. An optical amplifier comprising:
an optical amplification unit that amplifies an optical signal propagating in a plurality of propagation modes; and
the differential mode attenuation compensator according to claim 1 arranged at a rear stage of the optical amplification unit in a propagation direction of the optical signal.

* * * * *